United States Patent
Bellotti et al.

(10) Patent No.: US 6,626,591 B1
(45) Date of Patent: Sep. 30, 2003

(54) METHOD OF REDUCING INTENSITY DISTORTION INDUCED BY CROSS PHASE MODULATION IN A WDM OPTICAL FIBER TRANSMISSION SYSTEM

(75) Inventors: Giovanni Bellotti, Parma (IT); Sébastien Bigo, Palaiseau (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/464,391

(22) Filed: Dec. 16, 1999

(30) Foreign Application Priority Data

Dec. 21, 1998 (FR) .............................................. 98 16109

(51) Int. Cl.$^7$ .............................................. H04J 14/02
(52) U.S. Cl. .......................... 398/79; 398/147; 398/173; 398/175; 398/178; 398/141; 398/140; 398/102; 398/160; 398/161; 385/24; 385/27; 385/122; 385/123; 385/37
(58) Field of Search ................................ 398/147, 148, 398/79, 173, 102, 175, 178, 160, 161, 141, 140; 385/122, 123, 24, 27, 37

(56) References Cited

U.S. PATENT DOCUMENTS

| | | | | | |
|---|---|---|---|---|---|
| 4,953,939 | A | * | 9/1990 | Epworth | ................... 350/96.19 |
| 5,473,719 | A | * | 12/1995 | Stone | ........................... 385/123 |
| 6,373,608 | B1 | * | 4/2002 | Desurvire et al. | ........... 359/158 |
| 6,381,048 | B1 | * | 4/2002 | Chraplyvy et al. | .......... 359/124 |

FOREIGN PATENT DOCUMENTS

| | | |
|---|---|---|
| EP | 0 657 754 A1 | 6/1995 |
| GB | 2 161 612 A | 1/1986 |

OTHER PUBLICATIONS

K. Inoue, "Suppression Technique for Fiber Four–Wave Mixing Using Optical Multi–/Demultiplexers and a Delay Line", Journal of Lightwave Technology, vol. 11, No. 3, Mar. 1, 1993 pp. 455–461, XP000577337.

* cited by examiner

*Primary Examiner*—Leslie Pascal
*Assistant Examiner*—Hanh Phan
(74) *Attorney, Agent, or Firm*—Sughrue Mion, PLLC

(57) ABSTRACT

The invention relates to a method of reducing the intensity distortion induced by cross phase modulation in a wavelength division multiplexed optical fiber transmission system comprising a transmission line made up of a plurality of optical fiber segments with repeaters interposed between successive optical fiber segments, the transmission system having N different wavelength channels, where N is an integer greater than unity. In each repeater interconnecting first and second consecutive fiber segments, a time offset is introduced between the channels in such a manner that compared with the inlet of the first optical segment, the $(n+1)^{th}$ and the $n^{th}$ channels are offset by $\tau_n$ at the inlet to the second fiber segment, where n is an integer less than or equal to N, where $\tau_n$ is selected to be greater than zero and less than a value that eliminates correlation between the intensity distortion contributions of each fiber segment.

9 Claims, 5 Drawing Sheets

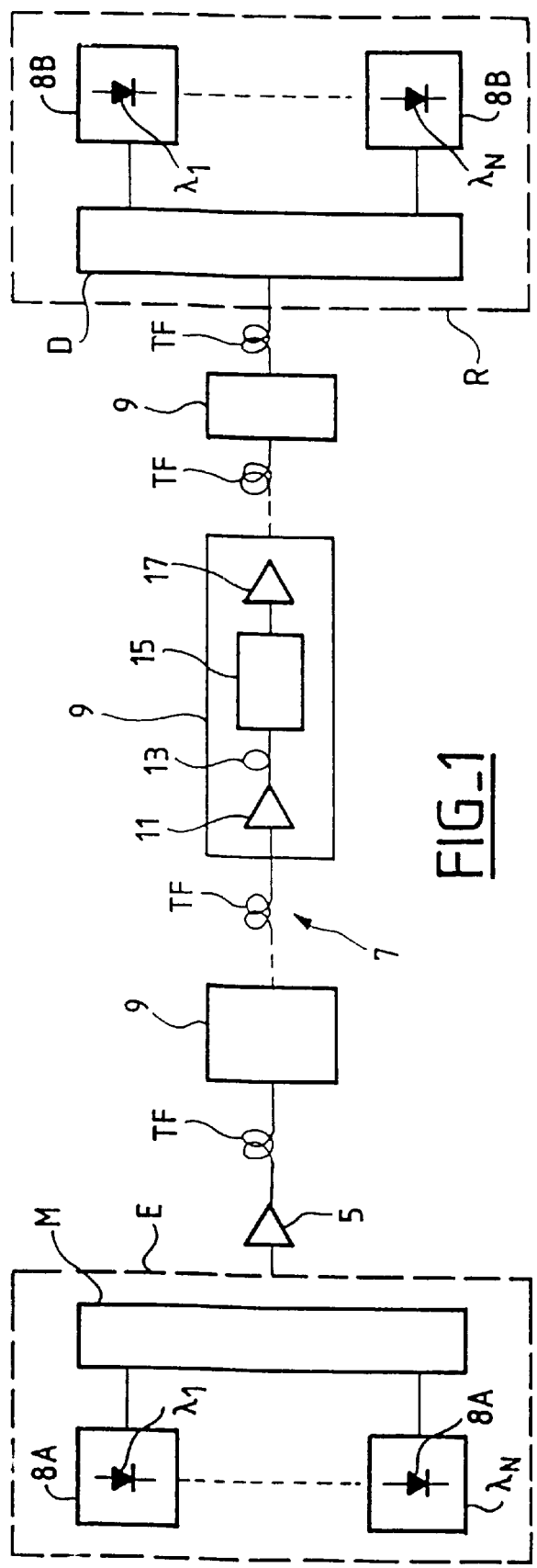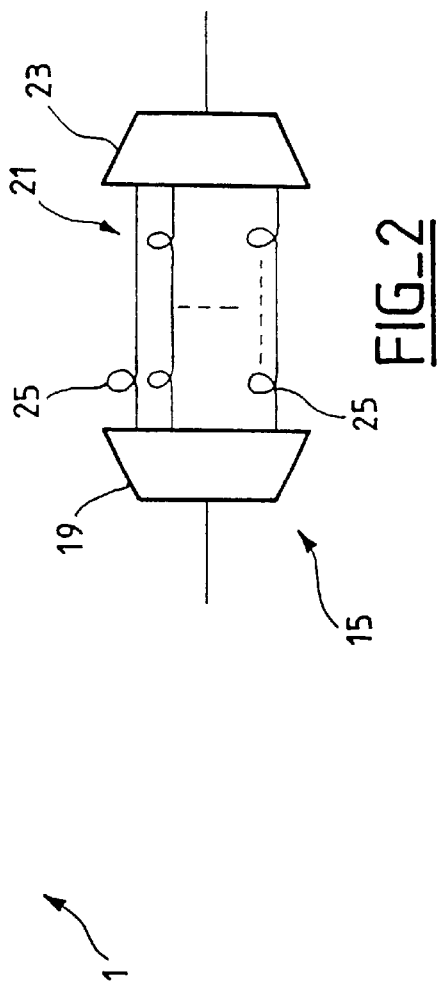

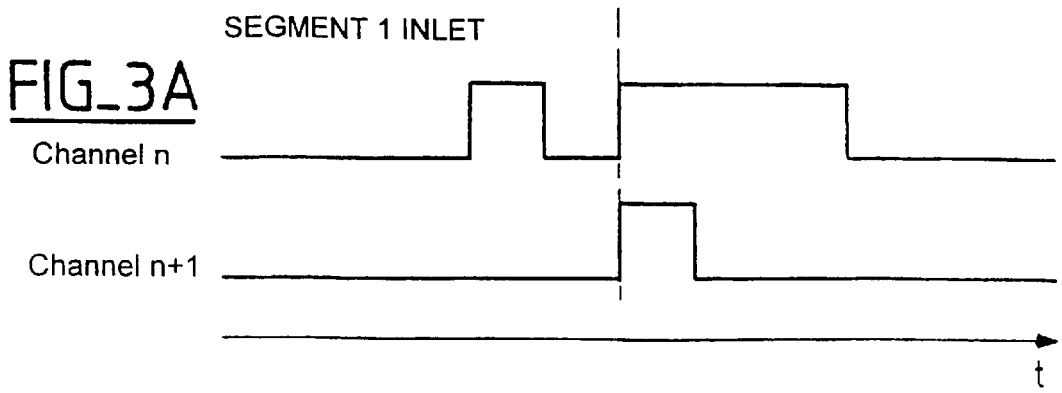
FIG_3A SEGMENT 1 INLET
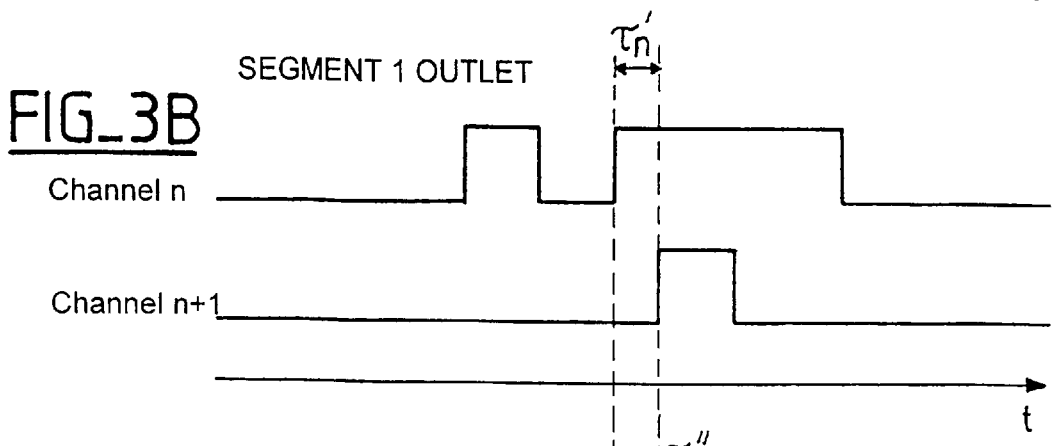
FIG_3B SEGMENT 1 OUTLET
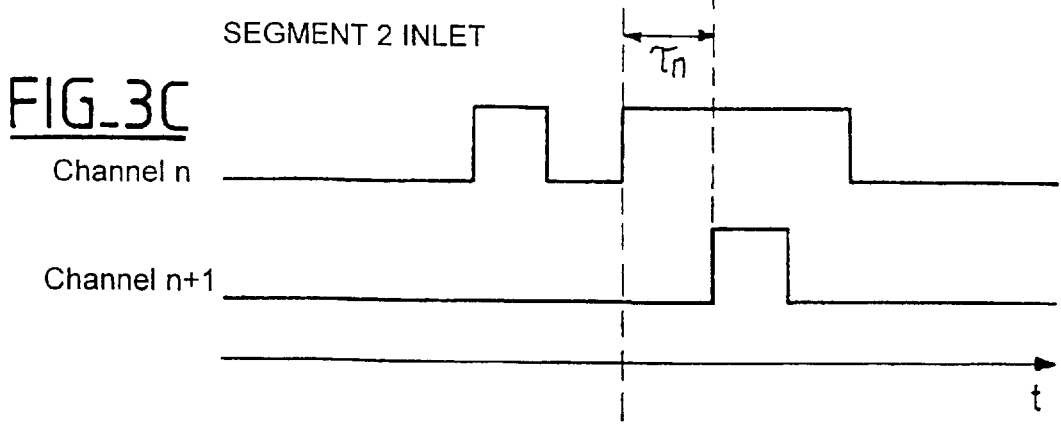
FIG_3C SEGMENT 2 INLET
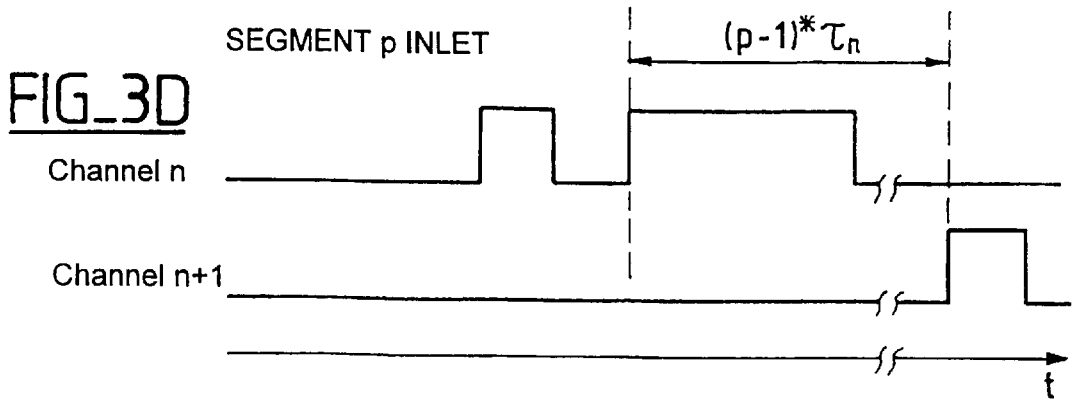
FIG_3D SEGMENT p INLET

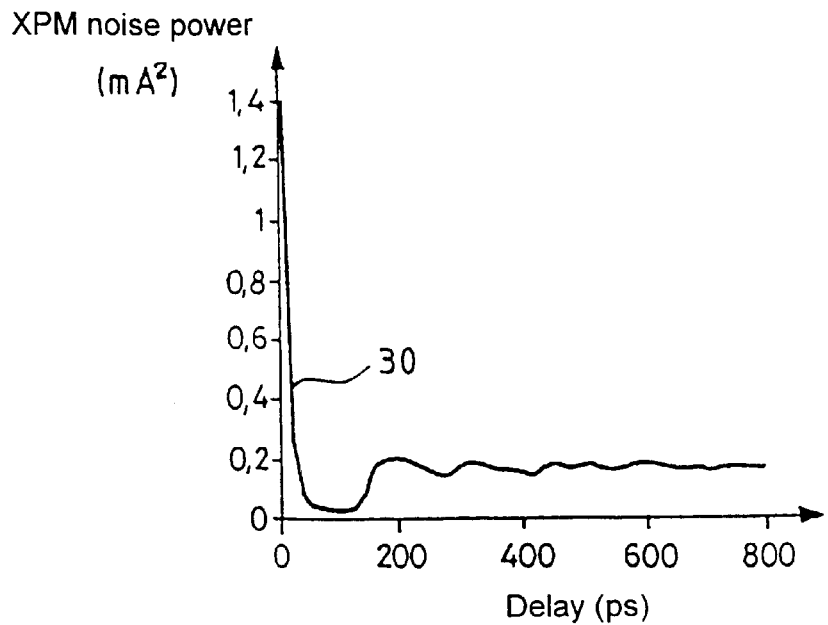
FIG_4
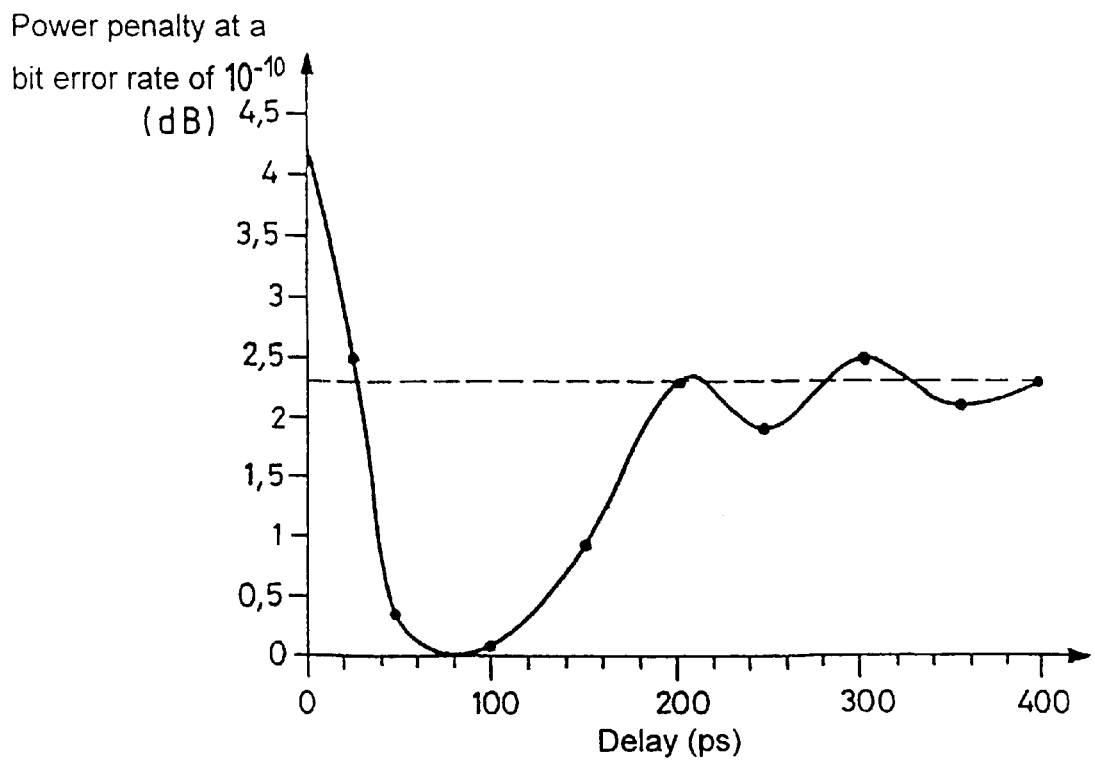
FIG_5

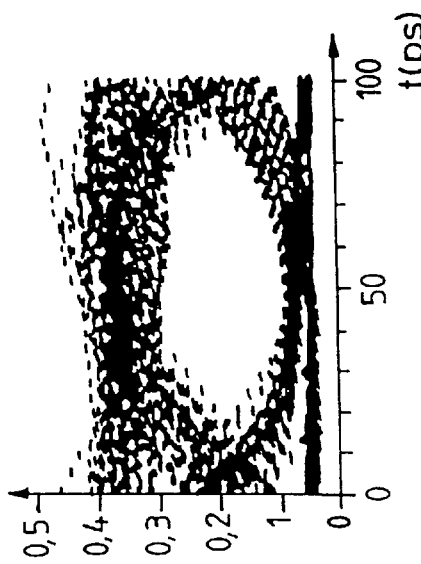
FIG_6B
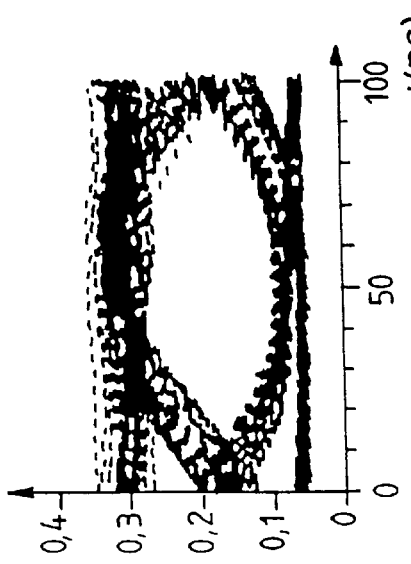
FIG_7B
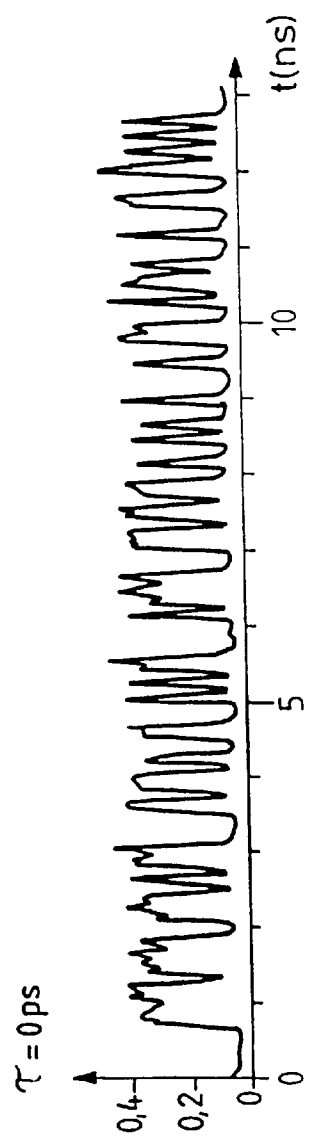
FIG_6A
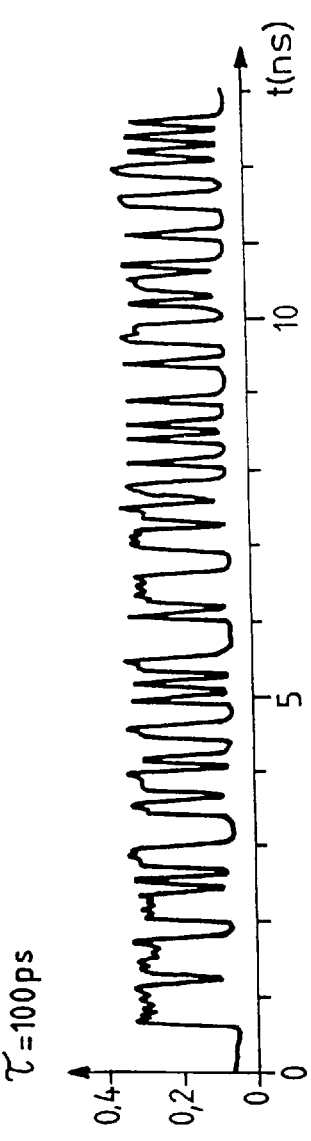
FIG_7A

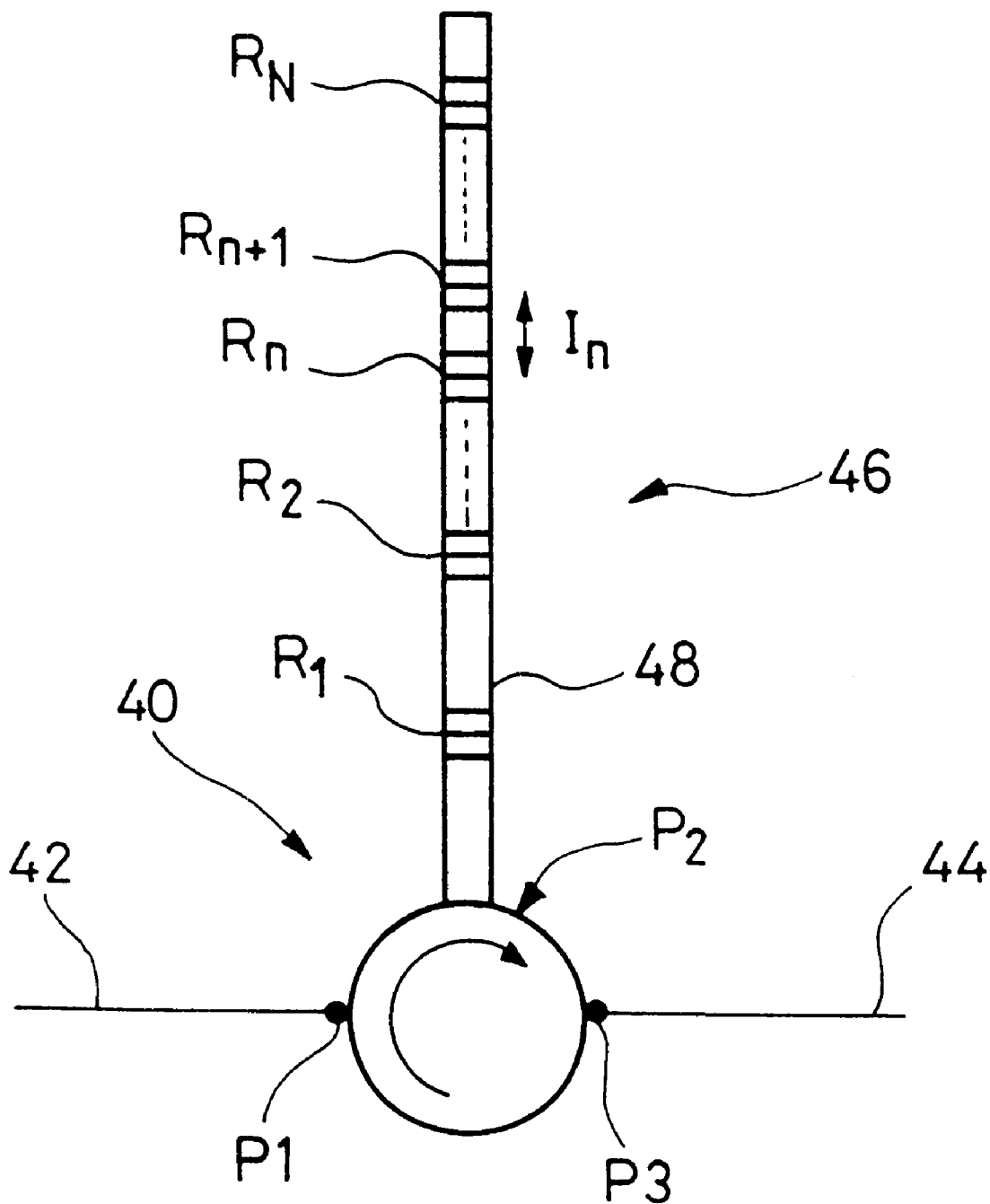

METHOD OF REDUCING INTENSITY DISTORTION INDUCED BY CROSS PHASE MODULATION IN A WDM OPTICAL FIBER TRANSMISSION SYSTEM

The present invention relates to a method of reducing the intensity distortion induced by cross phase modulation in a wavelength division multiplexed (WDM) optical fiber transmission system.

BACKGROUND OF THE INVENTION

An important factor in satisfying ever-increasing requirements concerning data transmission rates lies in mastering the technology of wavelength division multiplexed optical fiber transmission.

Wavelength division multiplexing, referred to below by the initials WDM, consists in combining a plurality of modulated channels in a single fiber, each channel using a different carrier wavelength. Thus, the total data rate of a transmission line is equal to the sum of the data rates of the various channels.

Nevertheless, WDM is subject to propagation limits. These limits are due to linear effects such as group velocity dispersion (GVD), and to non-linear effects such as phase self-modulation and cross phase modulation.

More particularly, the present invention relates to reducing the effect of cross phase modulation (XPM) in WDM optical fiber transmission systems.

XPM is a multichannel effect in which phase modulation is induced in a channel by the intensity of the signal(s) in the adjacent channel(s). This phenomenon thus leads to GVD distortions in the intensity of the signal to be transmitted, thereby limiting the maximum power that can be introduced into a transmission optical fiber.

Unfortunately, the higher the power introduced into a transmission optical fiber, the greater the distance that can be allowed between repeaters in a line, or the greater the total possible transmission distance.

From the article by R. A. Saunders et al., entitled "Compensation of cross phase modulation in 10 Gbit/s WDM systems by interfering channel prechirp", OFC'98, Paper FC3, San Diego, Calif., February 1998, a method of reducing XPM is known in which XPM is compensated by modulating the optical signal for transmission at the emitter with phase opposite to that induced by the XPM.

However, that solution is suitable only for optical fibers that present dispersion that is very low. Furthermore, that method does not take account of the interaction between chromatic dispersion and the Kerr effect.

Furthermore, that method is difficult to implement since it requires full knowledge of all of the channels, e.g. concerning their powers and modulation formats.

OBJECTS AND SUMMARY OF THE INVENTION

The present invention seeks to mitigate those various drawbacks by proposing a method which makes it possible in a manner that is effective and simple to reduce the intensity distortion induced by cross phase modulation in a WDM optical fiber transmission system.

To this end, the invention provides a method of reducing the intensity distortion induced by cross phase modulation in a wavelength division multiplexed optical fiber transmission system comprising a transmission line made up of a plurality of optical fiber segments with repeaters interposed between successive optical fiber segments, the transmission system having N different wavelength channels, where N is an integer greater than unity, wherein, in each repeater interconnecting first and second consecutive fiber segments, a time offset is introduced between the channels in such a manner that compared with the inlet of the first optical segment, the $(n+1)^{th}$ and the $n^{th}$ channels are offset by $\tau_n$ at the inlet to the second fiber segment, where n is an integer less than or equal to N, where $\tau_n$ is selected to be greater than zero and less than a value that eliminates correlation between the intensity distortion contributions of each fiber segment.

The method of the invention may further comprise one or more of the following characteristics:

for all channels $\tau_n = \tau$;

the time offset $\tau$ is less than about 600 ps;

the time offset $\tau$ is selected in such a manner as to obtain destructive interference between the various contributions to distortion of the individual optical fiber segments;

the time offset $\tau$ lies approximately in the range T/10 to 1.5*T where T is the duration of one bit;

the time offset $\tau$ lies approximately in the range 5 ps to 200 ps; and it further includes a step of demultiplexing prior to introducing time offsets between the channels, and a step of multiplexing performed after the time offsets between the channels have been introduced.

The invention also provides a unit for implementing the above-defined method, the unit comprising:

an inlet light waveguide for wavelength division multiplexed optical signals;

an outlet light waveguide for wavelength division multiplexed optical signals; and an optical circulator comprising first, second, and third ports with the first and third ports connected respectively to said inlet light waveguide and to said outlet light waveguide, and with a third light waveguide connected to the second port and comprising a fiber having a Bragg grating associated with each of the N channels to reflect the optical signals of the associated channel back to the second port, the distance $I_n$ between the $n^{th}$ and $(n+1)^{th}$ Bragg gratings being selected in such a manner as to introduce a total delay $\tau_n''$ between the $(n+1)^{th}$ and the $n^{th}$ channel so as to obtain a time offset of $\tau_n$ between the $(n+1)^{th}$ and the $n^{th}$ channel at the inlet of the fiber segment following said unit relative to the offset between them at the inlet to the optical fiber segment preceding said unit, where $\rho_n$ is selected to be greater than zero and less than a value that eliminates correlation between the intensity distortion contributions from each fiber segment.

The invention also provides a unit for implementing the above-defined method, the unit comprising:

an inlet light waveguide for wavelength division multiplexed optical signals;

a demultiplexer for demultiplexing wavelength division multiplexed optical signals at the outlet from the inlet light waveguide into N individual channels;

a multiplexer for multiplexing the optical signals at the outlet from the N individual channels, the outlet from the multiplexer being connected to an outlet light waveguide; and a delay line disposed in each associated individual channel, the length of each delay line being selected in such a manner as to introduce a total delay $\tau_n''$ between the $(n+1)^{th}$ and the $n^{th}$ channels so as to obtain between the $(n+1)^{th}$ and the $n^{th}$ channels a time offset of $\tau_n$ at the inlet to the fiber segment following said unit relative to the offset between them at the inlet to the optical fiber segment preceding said unit, where $\tau_n$ is selected to be greater than zero and less than a value which eliminates the correlation between the intensity distortion contributions from each fiber segment.

BRIEF DESCRIPTION OF THE DRAWINGS

Other characteristics and advantages of the invention will appear on reading the following description given by way of non-limiting example and with reference to the accompanying drawings, in which:

FIG. 1 is a block diagram of a data transmission system implementing the method of the invention;

FIG. 2 is a block diagram of a portion of the repeater module of FIG. 1;

FIGS. 3A, 3B, 3C, and 3D constitute a sequence of four timing diagrams showing the time offsets between two channels n and n+1 at different locations in the transmission system, in order to illustrate the method of the invention;

FIG. 4 is a graph showing the result of digital simulation of equipment implementing the method of the invention with ten segments of SMF fiber, each having a length of 100 km;

FIG. 5 is a graph showing experimental results obtained with an experimental setup implementing the method of the invention;

FIGS. 6A and 6B are graphs showing respectively a bit sequence and an eye diagram when the time offset between the two channels is 0 ps;

FIGS. 7A and 7B are graphs showing respectively a bit sequence and an eye diagram when the time offset between the two channels is 100 ps; and FIG. 8 is a view identical to that of FIG. 2, but showing a variant repeater module.

MORE DETAILED DESCRIPTION

FIG. 1 is a block diagram of a WDM optical fiber data transmission system 1.

This system 1 comprises, in an in-line configuration, a light emitter E for emitting wavelength division multiplexed (WDM) optical signals, an input first optical amplifier 5, a WDM signal optical fiber transmission line 7, and a light receiver R.

The emitter E comprises a plurality of light sources 8A each suitable for emitting light signals at a respective wavelength $\lambda_1, \lambda_2, \ldots, \lambda_n, \ldots, \lambda_N$ (where n is an integer in the range 1 to N; N being an arbitrary natural number) such that each source defines a transmission channel having an associated wavelength carrier, the sources being followed by a multiplexer M for introducing the light signals into the transmission line 7.

Symmetrically, the light receiver R comprises a demultiplexer D and a plurality of detectors 8B suitable for receiving light signals at respective wavelengths $\lambda_1, \lambda_2, \ldots, \lambda_N$.

The transmission line 7 comprises K segments TF of transmission optical fiber (where K is a natural number) By way of example, each segment TF is constituted by a standard single mode fiber (SMF) typically having dispersion of 17 ps/nm.km, and having a length of about 100 km, for example.

Between successive segments TF, there is disposed a repeater module 9 comprising, in line, a first optical amplifier 11, e.g. of the erbium-doped fiber amplifier (EDFA) type, a portion of dispersion compensated fiber (DCF) 13 for reducing the group velocity delay (GVD), a unit 15 for reducing cross phase modulation (XPM), and a second optical amplifier 17 which can likewise be of the EDFA type.

Reference is now made to FIG. 2 which is a more detailed block diagram of a first embodiment of the unit 15.

As can be seen in FIG. 2, the unit 15 comprises a demultiplexer 19 having one inlet and nine outlets, a set of N parallel optical fiber lines corresponding to the N transmission channels, and a multiplexer 23 having N inlets and one outlet.

Each optical fiber line includes an optical delay line 25 introducing relative delays between the channels such that the $(n+1)^{th}$ and the $n^{th}$ channel at the input to the optical fiber segment TF following the unit 15 are offset by $\tau_n$ relative to their positions in the fiber segment TF preceding the unit 15.

By way of example, FIGS. 3A, 3B, 3C, and 3D show the time offsets of two transmitted bit sequences respectively on the channel n and on the channel n+1 at different locations in the transmission system 1.

Thus, it can be seen in FIG. 3A that the bit sequence on channel n is: 10111, and the sequence on channel n+1 is: 00100. To show the principle of the invention more clearly, the bit sequences are synchronized at the inlet of the first fiber segment TF.

At the outlet from the first fiber segment TF, the two sequences are offset in time because of the chromatic dispersion in the fiber segment. Then, in the repeater module 9, the DCF fiber portion 13 reduces the dispersion between the two channels n and n+1 to a value $\tau_n'$ (see FIG. 3B).

Thereafter, given the time offsets applied to the two sequences at its input, the unit 15 for reducing XPM introduces an additional offset $\tau_n''$ between the sequences, such that compared with the inlet to the first fiber segment TF, the sequences of the channels n and n+1 are offset by $\tau_n$ at the inlet to the second optical fiber segment TF, as shown in FIG. 3C.

Thus, each unit 15 placed in the transmission line 7 introduces an offset such that at the inlet to segment p, the two sequences are offset by $(p-1)*\tau_n$ relative to their positions at the inlet to the first optical fiber segment TF of the transmission system 1. In this way, the XPM contributions of all of the fiber segments TF are taken into account.

In the method of the invention, $\tau_n$ is selected to be greater than zero and less than a value that eliminates the correlation between the intensity distortion contributions of the various fiber segments TF.

Advantageously, all of the channels are selected to have $\tau_n = \tau$, where $\tau$ is greater than 5 ps and less than about 600 ps.

XPM can be further reduced if the time offset $\tau$ is selected in such a manner as to obtain destructive interference between the various distortion contributions of the optical fiber segments TF. Under such circumstances, XPM can be reduced by a factor of about $K^2$.

To this end, the time offset $\tau$ is determined so as to lie approximately in the range T/10 to 1.5*T, where T is the duration of one bit.

Typically, the time offset $\tau$ is selected to lie in the range 5 ps to 200 ps.

FIG. 4 is a graph showing the result of a digital simulation of a transmission system of the kind described with reference to FIGS. 1 and 2 having ten SMF fiber segments each having a length of 100 km. Time offset or delay τ between two adjacent channels is plotted in ps along the abscissa, and XPM noise power is plotted in mA² up the ordinate.

The curve 30 in FIG. 4 shows clearly that XPM noise can be reduced effectively for τ less than 600 ps, i.e. when correlation is maintained between the distortion contributions of the individual TF segments, and that it reaches a minimum when it lies in the range 5 ps to 200 ps.

The effectiveness of the XPM-reducing unit 15 increases with increasing XPM effect. This applies, for example, to non-zero dispersion-shifted fiber (NZDSF) having dispersion of 2 ps/nm.km to 3 ps/nm.km, regardless of sign.

The transmission system 1 described with reference to FIGS. 1 and 2 has also been tested experimentally using two transmission channels at different wavelengths. In the experimental configuration, in order to maximize XPM, firstly the SMF was replaced by three segments TF of NZDSF having low dispersion and each having a length of 100 km, and secondly a polarization-controlling device was added in one of the two channels in the unit 15. The inlet power of the detected channel was 2 dBm and that of the other channel was 8 dBm.

In addition, the light sources 8A included in the emitter E had word generators each with its own clock and independent modulator.

During the experiment, the signal power (in dBm) was found at which the bit error rate became greater than $10^{-10}$.

The result of the experiment is shown by the graph in FIG. 5 where time offset or delay τ between the two channels is plotted in ps along the abscissa and the power penalty due to XPM is plotted in dB up the ordinate.

As can be seen in FIG. 5, the experimental result confirms the results of the digital simulations. It can thus clearly be seen that XPM can be reduced effectively by selecting τ so that it lies preferably in the range 5 ps to 200 ps so as to obtain destructive interference between the XPM contributions from the various fiber segments TF. In addition, it can be seen that for τ equal to about 75 ps, the noise power presents a minimum where it drops practically to the value of 0 dB. This means that by selecting τ to be equal to a value which corresponds to a maximum of destructive interference, the method of the invention makes it possible to eliminate practically all of the distortion due to XPM in a data transmission system fitted with units 15 of the invention.

FIGS. 6A, 6B and 7A, 7B show experimental results suitable for making a comparison between a configuration that is not corrected for XPM in which τ is equal to zero (FIGS. 6A and 6B), and a configuration implementing the method of the invention where τ is equal to 100 ps. In these two configurations, the bit sequences for the two channels were generated using the same clock.

FIGS. 6A and 7A are graphs showing a bit sequence as recorded during a dozen ns using respectively τ=0 ps and τ=100 ps.

On comparing FIGS. 6A and 71, it can clearly be seen that the bit sequence of FIG. 7A as obtained using the method of the invention is much less affected by distortion than is the sequence of FIG. 6A.

The eye diagrams 6B and 7B correspond respectively to the experimental configurations of FIGS. 6A and 7A and they confirm the observations made thereon.

The eye diagram corresponding to τ=100 ps (FIG. 7B) is much clearer and is wider open than is the eye diagram corresponding to τ=0 ps.

FIG. 8 is a block diagram showing a variant of the FIG. 2 unit 15 for reducing XPM.

This unit 15 comprises a three-port optical circulator 40 having ports referenced P1, P2, and P3. The optical circulator 40 is designed to transmit an optical signal received on its port P1 towards its port P2, and an optical signal received on its port P2 towards its port P3.

Optical circulators are known per se in the art, and their use with optical fibers is described, for example, in the article by Y. Fuji, entitled: "High isolation polarization-independent optical circulator coupled with single mode fibers", published in the American IEEE Journal "Journal of Lightwave Technology", Vol. 9, 1991, pp. 456 to 460, and also from an article by S. Nishi and K. Nakagawa, entitled: "Highly efficient configuration of erbium-doped fiber amplifier", published in "Proceedings of the 16th European Conference on Optical Communication", Sep. 16–20, 1990, Amsterdam, pp. 99 to 102.

The ports P1 and P3 of the circulator 40 are connected respectively to first and second light waveguides, specifically an inlet optical fiber 42 and an outlet optical fiber 44 of the unit 15.

A third light waveguide 46 is connected to the second port P2 of the circulator 40. This third waveguide 46 comprises a fiber 48 having a respective Bragg grating $R_n$ associated with each of the N channels. These Bragg gratings are advantageously photoinscribed directly in the fiber 48.

It will thus be understood that the light signal emitted in channel n of wavelength $\lambda_n$ and reaching the port P1 is conveyed to the port P2, travels along the fiber 48 as far as the Bragg grating $R_n$ at which it is reflected back to the circulator 40, and is then conveyed on from the port P2 to the port P3.

The distance $I_n$ along the fiber 48 between the $n^{th}$ Bragg grating $R_n$ and the $(n+1)^{th}$ Bragg grating $R_{n+1}$ is selected in such a manner as to introduce a total delay $\tau_n$" between the $(n+1)^{th}$ and the $n^{th}$ channel so as to obtain a time offset or delay of $\tau_n$ between the $(n+1)^{th}$ and the $n^{th}$ channel at the inlet to the fiber segment following the unit 15 relative to the offset between them at the inlet to the fiber segment preceding the unit 15, where $\tau_n$ is selected in the manner described with reference to FIGS. 2 and 3.

In an advantageous variant (not shown), the module 9 does not have any dispersion-compensated fiber (DCF) and it is the unit 15 which serves both to compensate dispersion and to reduce XPM.

It should also be observed that the method of the invention and the unit for implementing it can also reduce to a considerable extent the interactions that take place between channels due to stimulated Raman diffusion or to four-wave mixing (FWM).

What is claimed is:

1. A method of reducing intensity distortion induced by cross phase modulation in a wavelength division multiplexed optical fiber transmission system comprising a transmission line made up of a plurality of optical fiber segments with repeaters interposed between successive optical fiber segments, the transmission system having N different wavelength channels, where N is an integer greater than unity, wherein, in each repeater interconnecting first and second consecutive fiber segments, a time offset is introduced between the channels in such a manner that compared with an inlet of the first optical segment, the $(n+1)^{th}$ and the $n^{th}$ channels are offset by $\tau_n$ at an inlet to the second fiber segment, where n is an integer less than or equal to N, where $\tau_n$ is selected to be greater than zero and less than a value that eliminates correlation between the intensity distortion contributions of each fiber segment.

2. A method according to claim 1, wherein for all channels $\tau_n = \tau$.

3. A method according to claim 2, wherein the time offset $\tau$ is less than about 600 ps.

4. A method according to claim 2, wherein the time offset $\tau$ is selected in such a manner as to obtain destructive interference between the various contributions to distortion of the individual optical fiber segments.

5. A method according to claim 4, wherein the time offset $\tau$ lies approximately in the range T/10 to 1.5*T where T is the duration of one bit.

6. A method according to claim 4, wherein the time offset $\tau$ lies approximately in the range 5 ps to 200 ps.

7. A method according to claim 1, further including a step of demultiplexing prior to introducing time offsets between the channels, and a step of multiplexing performed after the time offsets between the channels have been introduced.

8. A unit for implementing the method according to claim 1, the unit comprising:
- an inlet light waveguide for wavelength division multiplexed optical signals;
- an outlet light waveguide for wavelength division multiplexed optical signals; and
- an optical circulator comprising first, second, and third ports with the first and third ports connected respectively to said inlet light waveguide and to said outlet light waveguide, and with a third light waveguide connected to the second port and comprising a fiber having a Bragg grating associated with each of the N channels to reflect the optical signals of the associated channel back to the second port, the distance $I_n$ between the $n^{th}$ and $(n+1)^{th}$ Bragg gratings being selected in such a manner as to introduce a total delay $\tau_n"$ between the $(n+1)^{th}$ and the $n^{th}$ channel so as to obtain a time offset of $\tau_n$ between the $(n+1)^{th}$ and the $n^{th}$ channel at the inlet of the fiber segment following said unit relative to the offset between them at the inlet to the optical fiber segment preceding said unit, where $\tau_n$ is selected to be greater than zero and less than a value that eliminates correlation between the intensity distortion contributions from each fiber segment.

9. A unit for implementing the method according to claim 6, the unit comprising:
- an inlet light waveguide for wavelength division multiplexed optical signals;
- a demultiplexer for demultiplexing wavelength division multiplexed optical signals at the outlet from the inlet light waveguide into N individual channels;
- a multiplexer for multiplexing the optical signals at the outlet from the N individual channels, the outlet from the multiplexer being connected to an outlet light waveguide; and
- a delay line disposed in each associated individual channel, the length of each delay line being selected in such a manner as to introduce a total delay $\tau_n"$ between the $(n+1)^{th}$ and the $n^{th}$ channels so as to obtain between the $(n+1)^{th}$ and the $n^{th}$ channels a time offset of $\tau_n$ at the inlet to the fiber segment following said unit relative to the offset between them at the inlet to the optical fiber segment preceding said unit, where $\tau_n$ is selected to be greater than zero and less than a value which eliminates the correlation between the intensity distortion contributions from each fiber segment.

* * * * *